United States Patent [19]

Saito

[11] 4,012,011
[45] Mar. 15, 1977

[54] TAPE CASSETTE

[75] Inventor: Shoichi Saito, Nakano, Japan

[73] Assignee: Olympus Optical Co., Ltd., Tokyo, Japan

[22] Filed: Oct. 21, 1975

[21] Appl. No.: 624,482

[30] Foreign Application Priority Data

Oct. 21, 1974 Japan ............................ 49-121744
Oct. 21, 1974 Japan ....................... 49-127660[U]
Oct. 21, 1974 Japan ....................... 49-127661[U]
Oct. 21, 1974 Japan ....................... 49-127662[U]

[52] U.S. Cl. .............................. 242/199; 360/132
[51] Int. Cl.² .................. G03B 1/04; G11B 15/32; G11B 23/04
[58] Field of Search .......... 242/55.19 A, 192, 194, 242/197-200; 360/93-96, 132; 352/72-78 R

[56] References Cited

UNITED STATES PATENTS

| 3,423,038 | 1/1969 | Katzef et al. ....................... 242/199 |
| 3,610,552 | 10/1971 | Shirakura et al. .................. 242/199 |
| 3,751,043 | 8/1973 | Bracci ........................... 242/199 X |
| 3,826,489 | 7/1974 | Watkins, Jr. ...................... 360/132 |
| 3,848,265 | 11/1974 | Biery et al. ........................ 360/132 |
| 3,950,786 | 4/1976 | Shapley ............................ 360/132 |

Primary Examiner—Leonard D. Christian
Attorney, Agent, or Firm—Ostrolenk, Faber, Gerb & Soffen

[57] ABSTRACT

A tape cassette comprises a pair of casing halves which are disposed in abutting relationship. The cassette internally houses a length of a magnetic tape which is disposed on a pair of tape hubs and which is exposed at a number of tape exposure ports located in one lateral edge thereof for engagement with tape drive means as well as a selected magnetic head, which are driven into the ports when the cassette is loaded on a tape recorder. The magnetic tape is magnetically processed by the selected magnetic head as the tape hub in the cassette is driven by the drive means located on the part of the tape recorder to run the magnetic tape. The opposite ends of the magnetic tape are secured to the pair of tape hubs by a pair of detents which are adapted to resiliently engage recesses formed in the peripheral edge of the respective tape hubs. The tape exposure ports of the tape cassette are defined in one lateral edge of the cassette by a plurality of sets of cooperating frame portions which are complementarily shaped in staggered relationship with respect to each other. A gap is formed between the frame portions of the oppositely located casing halves, and either forms an angle of inclination to the running direction of the tape or includes a plurality of gap portions which are displaced from each other crosswise of the tape and connected together by an interconnecting gap portion, thus preventing an unintended withdrawal of the magnetic tape from within the tape cassette. The tape cassette may be provided with lugs which may be broken to prevent an inadvertent erasure. The openings or apertures for receiving these lugs are covered with a detachable label, thereby facilitating the removal and the repeated use of the lugs.

17 Claims, 85 Drawing Figures

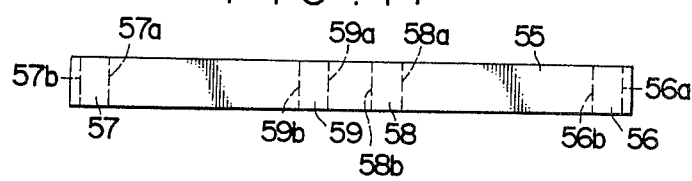
FIG. 14
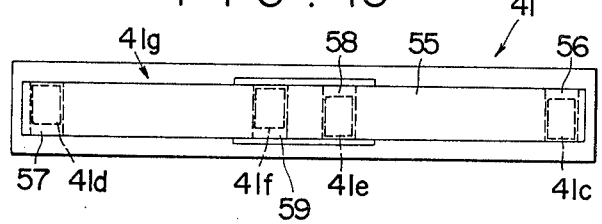
FIG. 15
FIG. 16    FIG. 17    FIG. 18
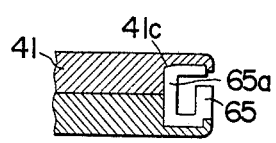 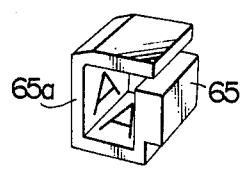 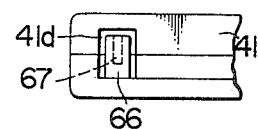
FIG. 19    FIG. 20    FIG. 21
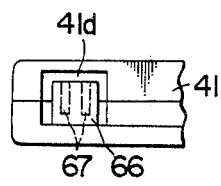 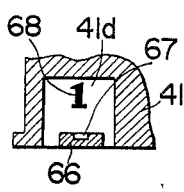 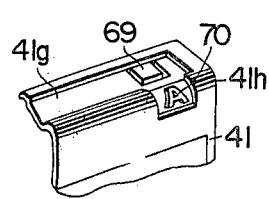

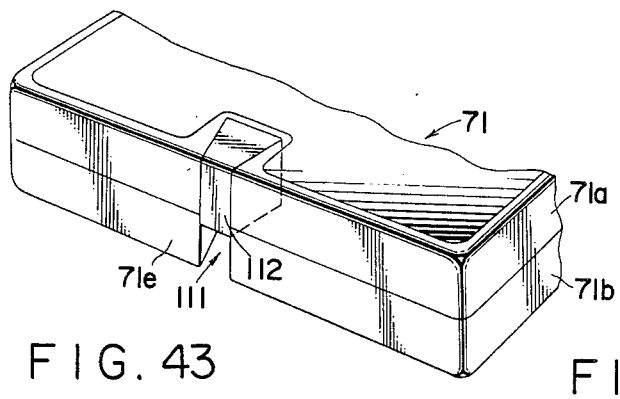
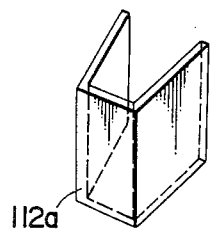 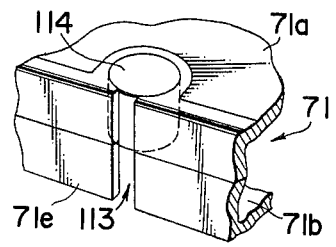
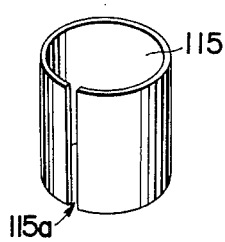
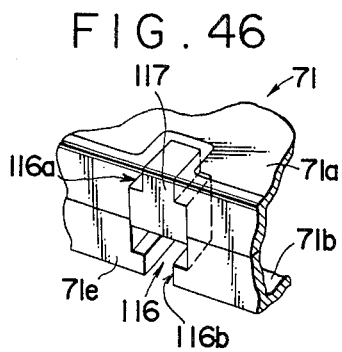
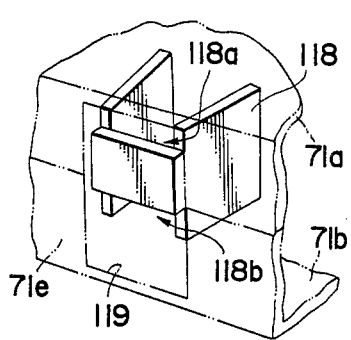 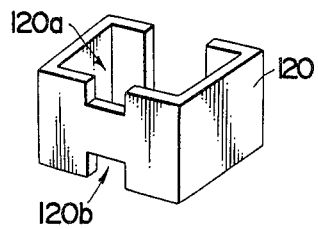

FIG. 70
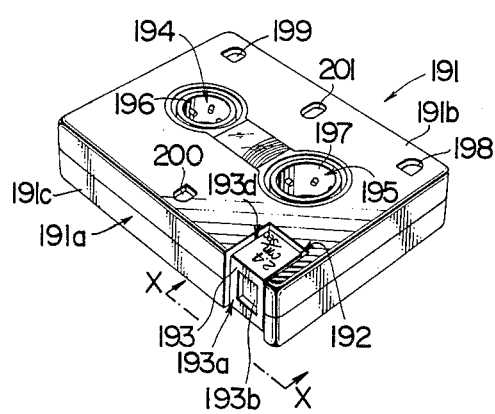
FIG. 71
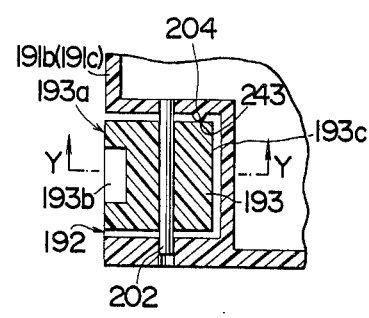
FIG. 72
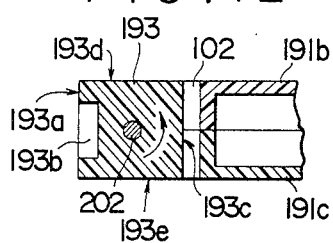
FIG. 73    FIG. 75
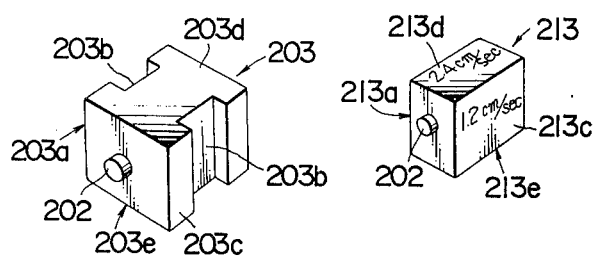
FIG. 74
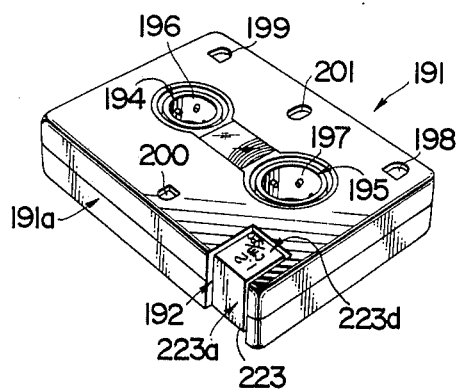
FIG. 76
FIG. 77
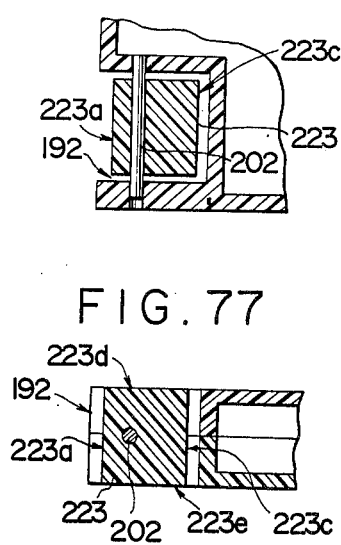

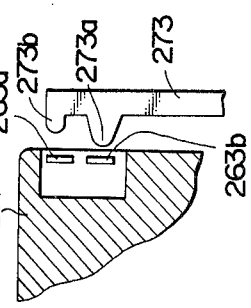
FIG. 85
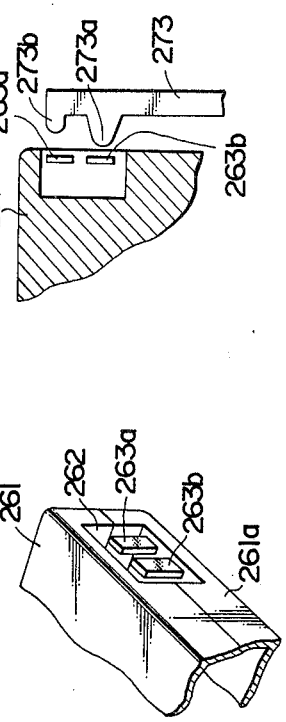
FIG. 83
FIG. 84

TAPE CASSETTE

BACKGROUND OF THE INVENTION

The invention relates to a tape cassette for use with a cassette tape recorder.

A tape cassette for use with a cassette tape recorder is in widespread use today, but involves a number of drawbacks which must be overcome to provide a satisfactory recorder operation. A tape cassette as used with a cassette tape recorder is formed with a plurality of tape exposure ports along its one lateral edge, including a first port for engaging the tape between a capstan and a pinch roller, a second port for permitting abutment of the tape against an erase magnetic head, and a third and/or a fourth port for permitting an abutment of the tape against a record and/or playback magnetic head. Usually the tape cassette is molded into a pair of casing halves which are fitted together to form a cassette casing. The tape exposure ports mentioned above are defined by a plurality of pairs of frame portions which extend from the respective casing halves. In the conventional construction, the oppositely located frame portions extend an equal length from the respective casing halves so that they abut each other along the centerline of a tape passageway. This results in disadvantages that during a tape cassette assembling operation, the tape which is passed along the exposure ports may be misled into and held between the abutting frame portions to cause a damage to the tape or to cause a waste in the assembling time. To overcome these difficulties, there has been a proposal to configure the abutting frame portions such that they abut on one side of the centerline of the tape passageway. However, when the resulting tape cassette is loaded on a tape recorder, the tape may be jutted out through the gap between the frame portions during its running, thereby causing a damage or breakage in the tape or presenting difficulties in restoring the tape to the normal position if it is not damaged or broken. The presence of the gap cannot be avoided when the tape cassette comprises a pair of casing halves. The above problem is compounded when the fact is considered that the gap must have a substantial length in order to assemble the both casing halves with a high accuracy.

SUMMARY OF THE INVENTION

It is an object of the invention to provide a tape cassette which includes a novel construction for the tape exposure ports, means for securing the magnetic tape to the tape hub, and lugs and lug apertures which may be used to avoid an inadvertent erasure of the record or to provide an indication of a tape running speed or for other purposes, thus improving the manoeuverability and facilitating the handling of the tape cassette and the associated tape recorder.

In accordance with the invention, the tape exposure ports are defined by frame portions, the abutting free ends of which are skewed, stepped or recessed to define a gap therebetween which extends in a direction different from the tape running direction. In this manner, an inadvertent withdrawal of the magnetic tape is completely prevented, and no particular machining precision is required in forming the abutting portions. In addition, means for securing the opposite ends of the magnetic tape to the tape hubs is improved as are the lugs and lug apertures, thus improving the overall performance.

BRIEF DESCRIPTION OF THE DRAWINGS

FIG. 14 is a side elevation of the tape cassette according to the invention, showing the rear portion of the label;

FIG. 15 is a side elevation of the tape cassette according to the invention to which the label is applied;

FIG. 16 is a fragmentary cross section of a lug which is used in the tape cassette according to the invention;

FIG. 17 is a perspective view of the lug shown in FIG. 16;

FIGS. 18 and 19 are front views of a portion of the tape cassette including the lug which is provided in further embodiments of the invention;

FIG. 20 is a fragmentary cross section of the tape cassette of the invention having a lug which is shown broken to expose and display a character indicating the associated tape surface;

FIG. 21 is a perspective view of a lug in a further embodiment of the invention;

FIG. 42 is a fragmentary perspective view of the tape cassette according to the invention, showing a further lug;

FIG. 43 is a perspective view illustrating still another configuration of the lug;

FIG. 44 is a fragmentary perspective view of the tape cassette according to the invention, illustrating still further configuration of the lug;

FIG. 45 is a perspective view of a still additional lug which may be used in the present invention;

FIGS. 46 and 47 are further illustrations of the lug in perspective;

FIGS. 48 to 54 are perspective views, showing different configurations of the lug in the tape cassette according to the invention;

FIG. 70 is a perspective view of the tape cassette constructed according to one embodiment of the invention;

FIG. 71 is a cross section of the lug member taken along the line X—X shown in FIG. 63;

FIG. 72 is a cross section taken along the line Y—Y shown in FIG. 64;

FIG. 73 is a perspective view, showing a further example of the lug member;

FIG. 74 is a perspective view of the tape cassette according to a further embodiment of the invention;

FIG. 75 is a perspective view, showing another example of the lug member;

FIG. 76 is a cross section of the lug member shown in FIG. 74;

FIG. 77 is a side elevation, partially in section, of the lug member shown in FIG. 76;

FIG. 83 is a chart illustrating the manner of operation of the lug and the lug detecting member in the tape cassette according to the invention;

FIG. 84 is a fragmentary perspective view, illustrating the arrangement of the lug in the tape cassette according to the invention; and FIG. 85 is a plan view, partially in section, of the lug detecting member located relative to the lug shown in FIG. 84.

DETAILED DESCRIPTION OF EMBODIMENTS

Figure 1:
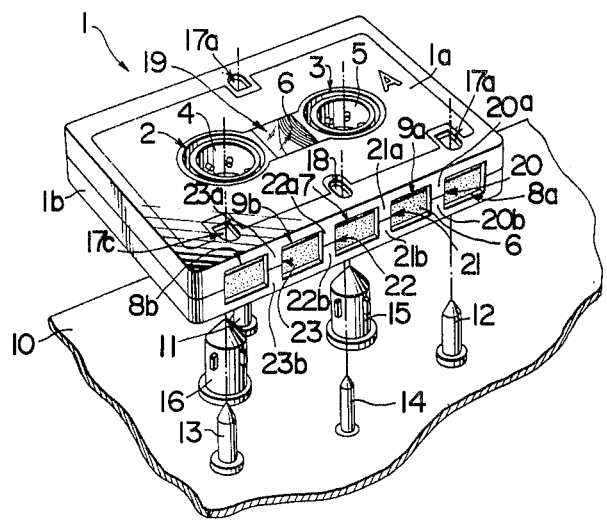
FIG. 1 is a perspective view of a conventional tape cassette in combination with a typical tape recorder.
Figure 2:
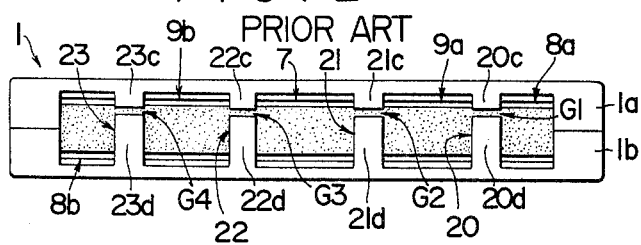
FIG. 2 is a front view of a conventional tape cassette.

Referring to FIG. 1, there is shown a conventional tape cassette 1. As shown, the tape cassette 1 is formed by a pair of upper and lower casing halves 1a, 1b. The cassette is provided with a pair of axial bores 2, 3 which extend through both casing halves 1a, 1b, and a pair of tape hubs 4, 5 are internally housed within the cassette and are aligned with these bores. A magnetic tape 6 has its opposite ends secured to the tape hubs 4, 5, respectively, and is wound thereon and extends therebetween. In one of its lateral edges which is located on the front side when the cassette is mounted on an associated tape recorder, the cassette 1 is formed with a tape exposure port 7 for receiving a pinch roller, a pair of tape exposure ports 8a, 8b for receiving an erase head, and a pair of tape exposure ports 9a, 9b which receive a record and/or playback head. As is known, the tape extends in a tensioned condition along these exposure ports, thus exposing part thereof.

FIG. 1 also shows a deck 10 of a conventional tape recorder which includes a plurality of cassette positioning pins 11, 12, 13, a capstan 14, a tape supply shaft 15 and a taken-up shaft 16. At corresponding positions, the cassette 1 is formed with positioning apertures 17a, 17b, 17c which receive the positioning pins 11, 12, 13, respectively, and also with a capstan aperture 18 which receive the capstan 14. All of these apertures extend through both casing halves 1a, 1b, thus permitting the cassette to be loaded on the deck 10. In addition, the cassette 1 is formed with a viewport 19 centrally located in both its upper and lower surfaces for permitting an observation of a balance of a running magnetic tape 6 as well as the feeding condition thereof during a record or playback operation.

In the conventional design, these exposure ports are defined by frame portions 20, 21, 22 and 23, each of which comprises a pair of sections 20a, 20b of an equal length extending from the respective casing halves. These sections 20a, 20b are disposed in mating relationship along the centerline of the tape passageway. This simplifies machining the abutting sections to a required accuracy, but involves an inconvenience in that the magnetic tape 6 may be inadvertently placed into a gap $G_1$ between the sections 20a, 20b when the cassette is being assembled. To avoid such difficulty, there has been an alternative arrangement in which the abutting sections 20a, 21a, 22a, 23a downwardly extending from the upper casing half 1a have a reduced length compared to the respective abutting sections 20b, 21b, 22b, 23b extending from the lower casing half 1b, so that the abutment occurs at an offset position from the centerline of the tape passageway. While this facilitates the assemblying operation, there arises the risk that during running, the magnetic tape 6 may be jutted out through respective gaps $G_1$, $G_2$, $G_3$, $G_4$ defined between the abutting sections.

Figure 3:
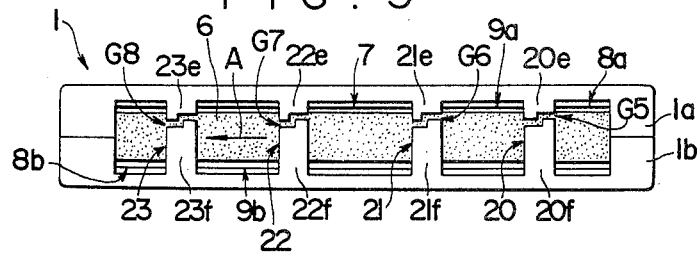
FIGS. 3 and 4 are front views of tape cassettes which are constructed in accordance with embodiments of the invention.

Referring to FIGS. 3 to 8, a tape cassette constructed according to the invention which eliminates such inconvenience will be described below. Referring to FIG. 3, the frame portions 20, 21, 22, 23 include pairs of abutting sections 20e, 21e, 22e, 23e and 20f, 21f, 22f, 23f. The abutting sections 20e to 23e extending from the casing half 1a have a reduced length relative to the abutting sections 20f to 23f which extend from the other casing half 1b. In addition, the free end of each of these abutting sections is formed into a complementary configuration to each other, thereby forming crank-shaped gaps $G_5$, $G_6$, $G_7$, $G_8$. Thus, these gaps $G_5$ to $G_8$ include a portion which extends in a direction different from the tape running direction A, thus effectively preventing the magnetic tape 6 from jutting out of the cartridge.

Figure 4:
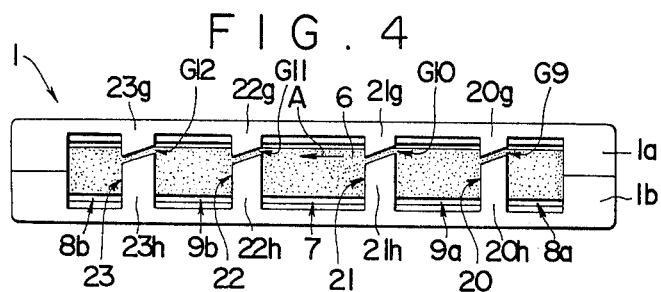
Figure 5:
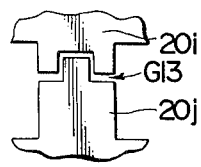
FIGS. 5 to 7 are fragmentary front views of other tape cassettes constructed in accordance with further embodiments of the invention.
Figure 6:
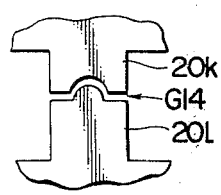
Figure 7:
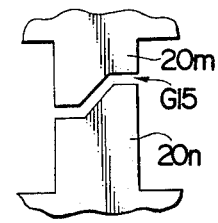
Figure 8:
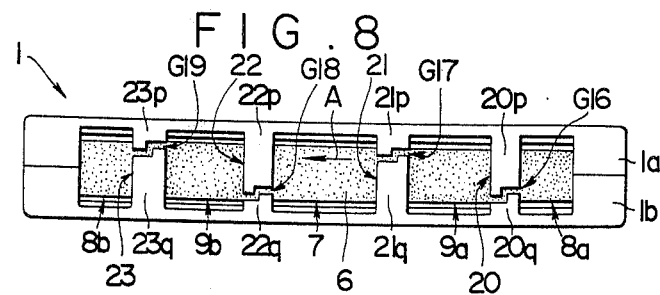
FIG. 8 is a front view of a tape cassette constructed in accordance with an additional embodiment of the invention.

FIG. 4 shows a different configuration in which abutting sections 20g, 21g, 22g, 23g and 20h, 21h, 22h, 23h each have their free end bevelled in a complementary manner, thereby forming skewed gaps $G_9$, $G_{10}$, $G_{11}$, $G_{12}$ relative to the tape running direction. FIG. 5 illustrates another example in which abutting sections 20i, 20j are configured to form a sawtooth-shaped gap $G_{13}$. In FIG. 6, an arcuate gap $G_{14}$ is defined between a pair of abutting sections 20k, 20l. Additionally FIG. 7 shows a pair of abutting sections 20m, 20n defining a gap $G_{15}$ therebetween which includes a pair of axially extending portions interconnected by a skewed portion. While the above examples have been described with respect to the frame portion 20, it should be understood that other frame portions 21 to 23 are constructed in the similar manner. In FIG. 8, a plurality of abutting sections 20p, 21p, 22p, 23p and 20q, 21q, 22q, 23q which define crank-shaped gaps $G_{16}$, $G_{17}$, $G_{18}$, $G_{19}$, respectively, as in the example shown in FIG. 3, are disposed in staggered relationship with respect to the centerline along the tape running direction. It should be understood that various forms of gaps described above may be disposed in the corresponding staggered relationship.

Figure 9:
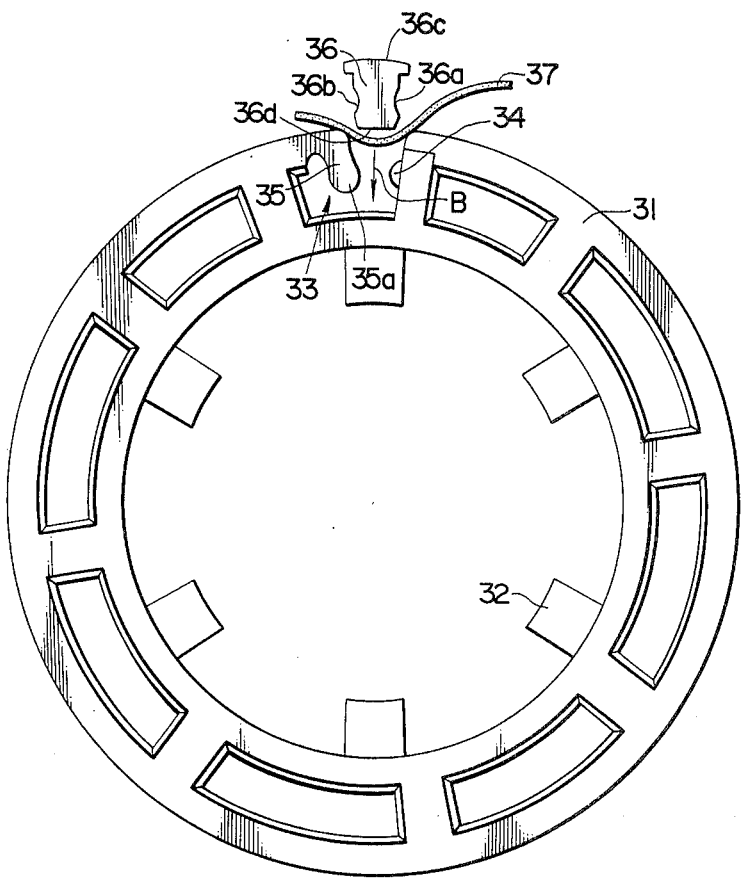
FIG. 9 is a plan view of a tape cassette according to the invention, illustrating means for securing the tape ends.

The invention also provides means for positively securing the opposite ends of the magnetic tape to the tape hubs. Referring to FIG. 9, there is shown a hub 31 for a tape cassette which is molded from a suitable plastic material. Around its inner periphery, the hub is provided with a plurality of projections 32 for engagement with a drive shaft, not shown, which is provided on the part of an associated tape recorder. In its outer periphery, the hub 31 is formed with a recess 33, and a detent tab 34 is formed on one wall of the recess 33. A portion of the wall forming the outer periphery of the hub is bent inwardly to form a projection 35, the free end of which is provided with a nipple 35a which is located opposite to the tab 34. It is to be understood that the projection 35 has a sufficient resilience to cause the nipple 35a to be urged toward the tab 34, or against a tape detent 36 to be described later. The nipple 35a may be formed and imparted with resilience in any conventional manner.

Figure 10:
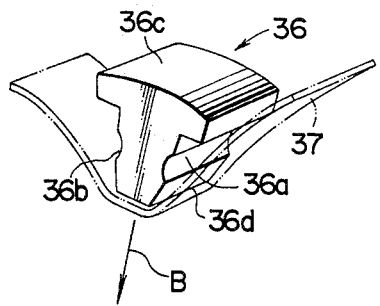
FIG. 10 is a fragmentary perspective view illustrating the relationship between the tape and the tape detent in the tape cassette according to the invention.
Figure 11:
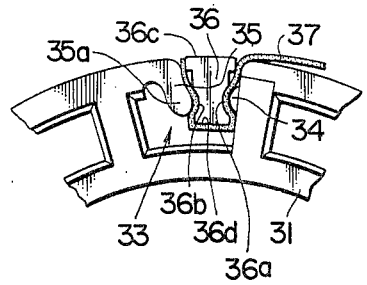
FIG. 11 is a fragmentary plan view of the tape cassette according to the invention, showing the tape locked in place in the tape hub.

The tape detent 36 is molded from a plastic material which is similar to that used to form the hub 31, and is provided with a pair of recesses 36a, 36b in its both lateral sides for engagement with the tab 34 and the nipple 35a. The top of the tape detent 36 is finished to a generally smooth surface 36c (see FIG. 11) which has substantially the same curvature as the outer periphery of the hub 31. The tape detent 36 is adapted to be fitted into the recess 33 of the hub 31 together with one end of a tape 37, as indicated by an arrow B. As indicated in FIG. 10, the end of the tape 37 is disposed so as to wrap the inner end 36d of the tape detent 36 when they are pressed into the recess 33. When the tape detent 36 and the tape 37 are fitted into the recess 33, the tab 34 and the nipple 35a engage the recesses 36a and 36b of the tape detent 36 with the tape 37 interposed therebetween, whereby the end of the tape 37 is locked against withdrawal by the cooperation of the tape detent 36 with the tab 34 and the nipple 35a.

In this manner, the tape end can be positively locked in place through a simple operation of pressing the tape detent 36 together with the tape end into the recess 33 formed in the hub 31. The engagement between the tab 34 and the nipple 35a on one hand and the tape detent 36 on the other assures a reliable locking of the tape end. By forming the top end of the tape detent 36 into the surface 36c having the same curvature as the outer periphery of the hub 31 so that the surface 36c is level with the latter when the tape detent 36 is fitted into the recess 33, wrinkles cannot be caused in the tape as a result of using the tape detent 36. Since the recess 33 has no sharp edge, a tape breakage is avoided.

A label applied to a tape cassette will now be considered. A conventional tape cassette (not shown) has both an "A" and a "B" surface and is formed with apertures (not shown) for the convenience of detecting a tape end. The rear surface is typically formed with apertures each having a lug for preventing an inadvertent erasure, and also with a pair of apertures each having a lug for switching a tape feed speed. A label applied to the A surface is also provided with apertures to expose the tape detecting apertures. However, the apertures 47a, 41b, the apertures 41c, 41d and the apertures 41e, 41f are to be closed or cleared in accordance with the intended function of a tape recorder which is used in conjunction with the tape cassette. The apertures 41c to 41f are initially closed by lugs 45 to 48 which are integral with the tape cassette 141.

In accordance with the invention, the label applied to the tape cassette is provided with removable portions which may be utilized to close or clear the lug apertures.

Figure 12:
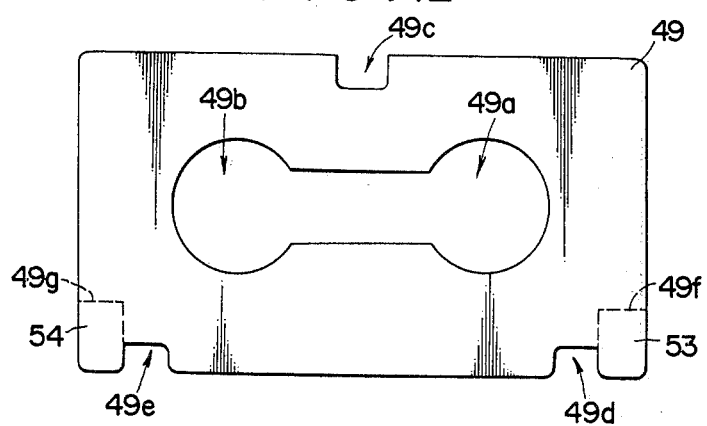
FIG. 12 is a plan view of a label applied to the tape cassette according to the invention.

Referring to FIG. 12, there is shown a label 49, which is formed with a pair of interconnected slots 49a, 49b for exposing a pair of hubs, a plurality of notches 49c, 49d, 49e which are located around the tape positioning apertures, and which is also provided with removable portions 53, 54 having perforated lines 49f, 49g. Initially the removable portions 53, 54 cover the tape end detection apertures, but may be removed to expose the tape end detection apertures when the associated tape or tape recorder has the function to detect such apertures. If the function is not provided, the tape end detection apertures are covered and concealed from sight by the removable portions 53, 54 of the label 49, which improves the appearance of the tape cassette.

Figure 13:
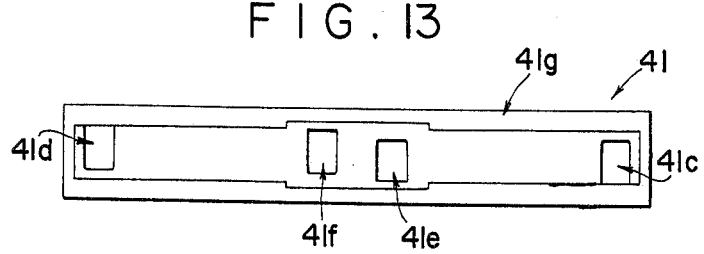
FIG. 13 is a side elevation showing the rear portion of the tape cassette according to the invention.

FIG. 14 shows a label 55 which is adapted to be applied to the rear surface of a tape cassette 41 shown in FIG. 13. The label 55 is provided with a plurality of removable portions 56, 57, 58 and 59 at positions corresponding to the apertures 41c to 41f, respectively (FIG. 15), and delineated by perforated lines 56a, 56b, 57a, 57b, 58a, 58b, 59a, 59b. This label 55 replaces the function of the lugs to cover the lug apertures 41c to 41f to simplify the manufacturing of the tape cassette 41. When the apertures 41c to 41f are to be closed again after they had been once cleared, the label 55 can be effectively utilized.

The removable portions 53, 54 and 56 to 59 of the labels 49, 55 may be previously printed or colored so that when the labels are applied to either the A or B surface of the tape cassette and these portions removed, an immediate recognition of the such removal is assured. It should be understood that the arrangement of the label, the location of the removable portions and their intended use may be varied as desired depending on the variety of tape cassette.

Referring to FIGS. 16 to 21, a lug which is provided on the tape cassette according to the invention will be described. As mentioned above, the combination of a lug and a lug aperture may be utilized for preventing an inadvertent erasure or for switching a tape feed rate, and may also be utilized for switching a bias voltage in accordance with the variety of the tape or for selecting a Dolby circuit. Usually, such lugs are formed integrally with and in the same color as the body of the cassette, and it is difficult to discern which lug corresponds to the A or B surface of the cassette. No specific indication is given for the respective lugs. This makes it difficult to determine which surface may be used for the purpose of recording.

In accordance with the invention, this disadvantage is eliminated by allocating a particular color or character to each lug so as to indicate the association of a particular lug with either cassette surface. In the embodiment shown in FIG. 16, a lug 65 is not integrally molded with the cassette 41, but is separately formed from a molding material of a color which is distinct from that of the cassette 41, and is fitted into a lug aperture 41c formed in one part of the cassette 41. As shown in FIG. 17, the lug 65 comprises a lug support 65a, and a lug piece which is integral therewith. The lug piece has an increased thickness compared to the support 65a, thereby facilitating a breakage of the lug piece from the support 65a. The lug 65 has a distinct color from any other lug, and suitable legends may be given on the label such as shown at 49 (see FIG. 12) applied to the cassette surface, so as to indicate which colored lug corresponds to a particular cassette surface. Alternatively, a letter "A" or "B" may be printed on the inner wall surface of the support 65a so that it can be viewed from the exterior to recognize the removal of a particular lug when that lug is removed.

In the embodiment shown in FIGS. 18 and 19, a lug 66 which is adapted to be disposed in a lug aperture 41d of the cassette 41 is formed of a transparent or translucent material of a color which is distinct from that of the cassette 41. On its rear surface or in its interior, the lug 66 is formed with a projection or projections or a recess or recesses which constitute a particular character 67 such as "1", "2" or "1", "11" "A", "B", thus providing a direct indication. In the embodiment shown in FIG. 20, a lug aperture 41d in which a lug 66 is disposed is provided with a character 68 on its bottom, indicating that the lug aperture 41d corresponds to the lug 66. It will be appreciated that when all the lugs are present on the cassette 41, it is not necessary to know the correspondence between a particular lug and its associated lug aperture, but that when any one lug is broken and removed, some indication must be provided in the lug aperture which is associated with the removed lug so as to indicate the function of the removed lug. To this end, in the embodiment shown in FIG. 20, the character 68 indicates the correspondence of a lug located in the lug aperture having that character to a particular cassette surface.

In the embodiment shown in FIG. 21, an indication is provided on the shoulder of the cassette 41 adjacent to a lug 69. In a tape cassette, in particular, a miniature tape cassette, the rear surface 41g which is located opposite to the front surface in which the tape exposure ports are located in connection with the major surfaces of the tape cassette through a gently curved surface 41h. A character 70 which distinguishes between A and B surfaces or 1 and 2 is provided on such a curved surface adjacent to the lug 69. The character 70 may be formed by either projection or grooves to permit reading even by a blind man, with his fingertip.

In a conventional tape cassette which is provided with a lug assembly, upper and lower casing halves not shown are provided with a pair of lug apertures which are normally blocked by respective lugs which are integrally formed with either casing half. One of the lugs may be broken to prevent an inadvertent erasure of the A surface (for example) when its magnetic tape runs from one hub to the other. Another lug may be broken to prevent an inadvertent erasure of the B surface (for example) when the tape runs in reverse. Both such lugs only serve to prevent an inadvertent erasure in an monoaural configuration. Also, when removed, the lugs cannot be replaced. However, such lug assembly is unsatisfactory in view of the fact that a plurality of functions have to be performed by a lug assembly for the purpose of adaptation to a stereophonic and educational applications, including a more complex anti-erasure feature, switching of a tape feed rate, a selection of Dolby circuit, and switching of a bias voltage in accordance with the tape material and the like. The conventional lug of the type which is simply broken cannot achieve these functions. In consideration of these aspects, the invention provides a lug assembly including a lug which is rockably mounted in a lug aperture so as to be movable between an aperture blocking position and an aperture clearing position, thus preventing a complete removal of the lug and facilitating a switching between the pair of positions.

Figure 22:
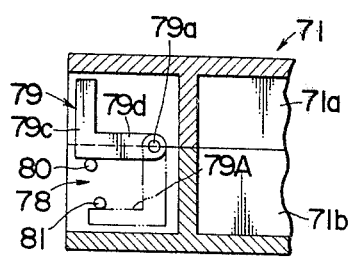
FIG. 22 is a cross section of a lug assembly in the tape cassette according to one embodiment of the invention.
Figure 23:
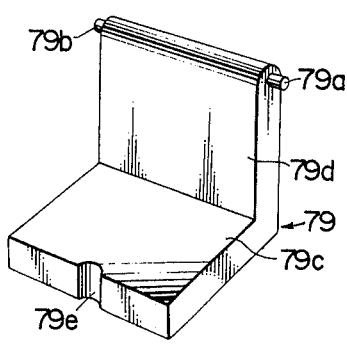
FIG. 23 is a perspective view, showing the configuration of the lug in detail.
Figure 24:
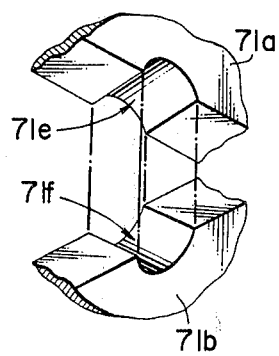
FIG. 24 is a perspective view showing the construction of a pivotal connection in the tape cassette according to the invention.

Referring to FIG. 22, there is shown a lug aperture 78 in which a lug 79 is rockably mounted by pivotally mounting a pair of studs 79a, 79b (see FIG. 23) extending from the opposite sides of one end thereof in the wall of the lug aperture. As indicated in FIG. 23, the lug 79 includes a blocking region 79c which is adapted to block the lug aperture, and a support 79d which supports the blocking region 79c, the blocking region 79c and the support 79d being formed at an angle of nearly 90° to each other. The studs 79a, 79b extend from the upper end, as viewed in FIG. 23, of the support 79d. A pair of upper and lower casing halves 71a, 71b which together constitute the casing of the tape cassette is formed with a pair of aligned, semi-cylindrical recesses 71e, 71f which receive the studs 79a, 79b, respectively, as illustrated in FIG. 24. It will be noted that the lower casing half 71b is provided with a pair of vertically spaced clicking ribs 80, 81 (see FIG. 22).

Figure 25:
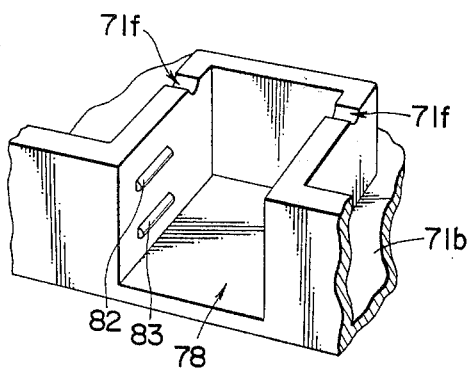
FIG. 25 is a perspective view, showing a portion of the lower casing half of the tape cassette according to the invention.
Figure 26:
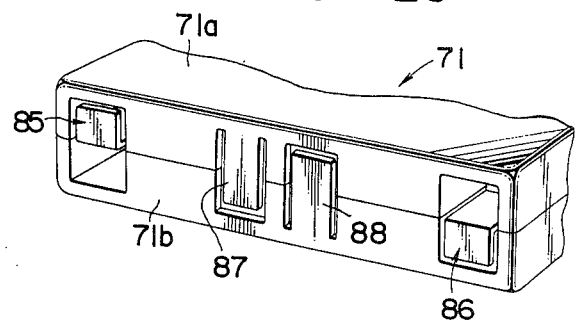
FIG. 26 is a perspective view of the tape cassette and the lugs according to the invention.

When the lug 79 is retained in the position shown in solid line in FIG. 26 by utilizing the rib 80, the blocking region 79c thereof blocks the lug aperture 78, while when it is retained in the position 79A indicated in phantom lines by utilizing the rib 81, the blocking region 79c clears the lug aperture 78. The blocking or clearing position of the blocking region 79c is detected by a suitable detector provided on the part of an associated tape recorder for controlling one or more of the functions such as the prevention of an inadvertent erasure, switching of the tape feed rate, selection of Dolby circuit, switching of the bias voltage or the like. When the lug 79 is to be moved from the blocking position to the clearing position, a screwdriver may be inserted into the clearance between the lug 79 and the upper casing half 71a. As indicated in FIG. 23, a recess 79e may be formed in the free end of the blocking region 79c. FIG. 25 shows the provision of a pair of rod-shaped clicking detent means 82, 83 on the wall of the lug aperture 78. Any other detent means may be employed, as desired. The lug assembly according to the invention can be located at any suitable position on the tape cassette, and any additional number of lug assemblies may be provided. The described lug assembly may be used in combination with a lug assembly of other configurations. By way of example, FIG. 26 shows a tape cassette 71 having a combination of the adjustable lug assemblies 85, 86 according to the invention and conventional lugs 87, 88.

Figure 27:
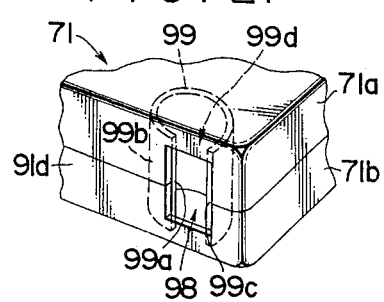
FIG. 27 is a perspective view of a different form of lug in the tape cassette according to the invention.
Figure 28:
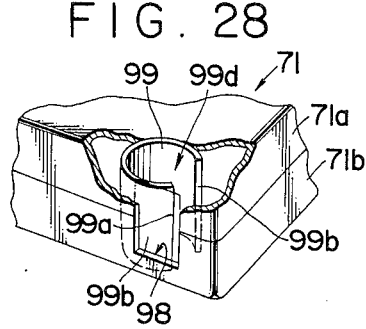
FIG. 28 is a perspective view of the lug shown in FIG. 27 in its operative position.

Referring to FIGS. 27 to 55, further embodiments of the lug assembly according to the invention will be described. Referring to FIG. 27, there is shown a tape cassette 71 which is formed with a lug aperture 98 adjacent to its rear surface 91d, the aperture 98 having a rectangular opening. The casing is solid in the region of the lug aperture, which is formed as a hollow cylinder therein. A distorted cylindrical lug 99 (see FIG. 33) having a hiatus 99d of substantially the same width as that of the opening in the lug aperture 98 is resiliently fitted into the lug aperture. A portion of the lug 99 which is located adjacent to its one edge 99a has substantially the same curvature as that of the wall defining the lug aperture 98, thus forming a covering region 99b which is adapted to block the lug aperture 98. Another portion of the lug which is adjacent to the other edge 99c has a reduced curvature as compared with the covering region 99b, and the edge 99c can be engaged by a member such as rod to press it inward. In the position shown in FIG. 27, the hiatus 99d is in alignment with the lug aperture 98, thus clearing it, but when a rod member such as pencil is used to press the other edge 99c inward, the lug 99 is rotated into the position shown in FIG. 28 in which the covering region 99b blocks the lug aperture 98.

Figure 29:
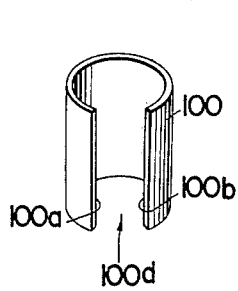
FIGS. 29 to 31 are perspective views, illustrating different configurations of the lug.

FIG. 29 shows a cylindrical lug 100 having a hiatus 100d therein as well as a pair of edges 100a and 100b, each of which may be pressed inward to cause the associated region to serve as a covering region.

Figure 32:
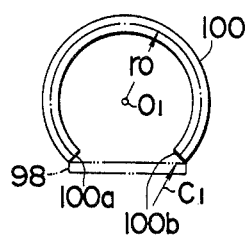
FIGS. 32 and 33 are schematic diagrams useful for illustrating the relationship between the configuration and the functional characteristic of the lug.
Figure 33:
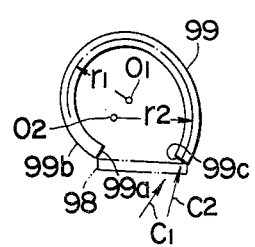
Figure 37:
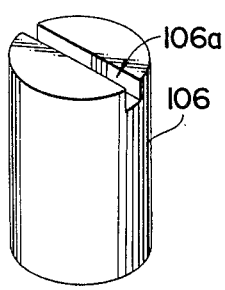

By way of comparison, FIG. 32 shows that the cylindrical lug 100 has a radius of curvature $r_0$ with respect to its center $O_1$, and FIG. 37 shows that the distorted cylindrical lug 99 has the covering region 99b having a radius of curvature $r_1$ from the center $O_1$, and another region having a radius of curvature $r_2$ which is greater than $r_1$ from its center $O_2$. It will be appreciated that the abutting force which is applied to the edge 100b of the cylindrical lug 100 must be applied in a direction having a relatively small angle with respect to the plane of the lug aperture 98 as indicated by an arrow $C_1$ (see FIG. 32) while such abutting force can be applied to the distorted cylindrical lug 99 in a direction which forms a greater angle with respect to the plane of the lug aperture 98, as indicated by an arrow $C_2$, so that it is easier to press inward the edge 99c of the lug 99 than with the lug 100.

Figure 30:
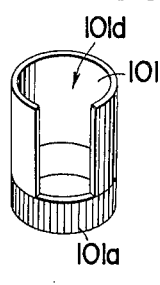
Figure 31:
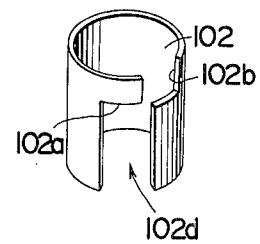

The lug 99 or 100 may have any other configuration, as exemplified in FIGS. 30 and 31 for a cylindrical lug. In FIG. 30, there is shown a lug 101 having a hiatus 101d, but having a continuous peripheral wall below the level of the hiatus, the continuous wall being knurled as shown at 101a. FIG. 31 shows a lug 102 having a projection 102a which extends from one edge of a hiatus 102d so as to be engaged by a pressing member, and also having a recess 102b formed in the other edge of the hiatus for insertion of a rod or the like.

Figure 34:
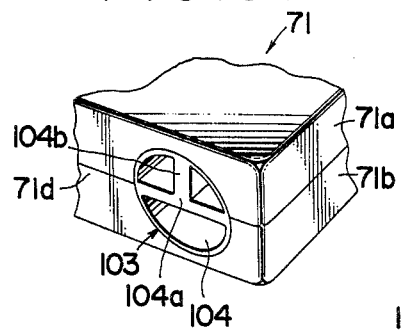
FIG. 34 is a fragmentary perspective view of another form of the lug.
Figure 35:
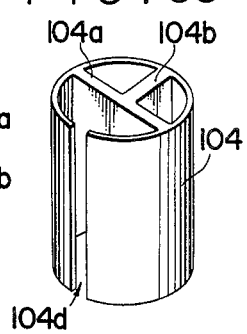
FIGS. 35 to 37 are fragmentary views, illustrating further configurations of the lug.
Figure 36:
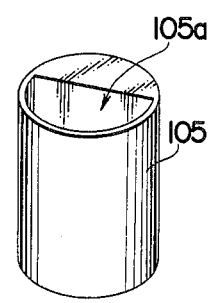

FIG. 34 shows a hollow cylindrical lug aperture 103 in which a cylindrical lug 104 is rotably mounted. Internally, the lug 104 is formed with a partition wall 104a and a blocking wall 104b which is located on one side of the partition wall 104a. The relative position of the blocking wall 104b to the partition wall 104a represents a closed and an open position of the lug aperture 103, and the lug can be rotated to switch between such positions. As illustrated in FIG. 35, the lug 104 may be formed with a hiatus 104d, which can be utilized to resiliently mount the lug in the lug aperture 103. As further alternatives, FIG. 36 shows a lug 105 having a semi-cylindrical opening 105a, and FIG. 37 shows a lug 106 which is formed with a groove 106a. In the arrangement of FIG. 36, the exposure of the semi-cylindrical opening 105a represents an open position, and in FIG. 37, the orientation of the groove 106a represents an open or closed position.

Figure 38:
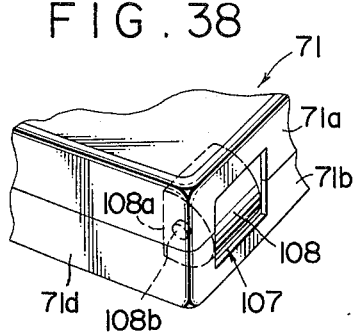
FIG. 38 is a fragmentary perspective view of still another configuration of the lug.
Figure 39:
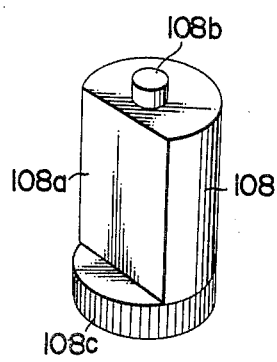
FIGS. 39 to 41 are perspective views, illustrating additional configurations of the lug.
Figure 40:
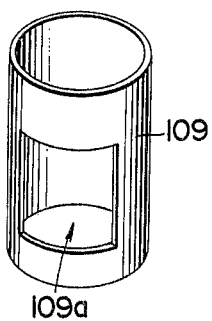
Figure 41:
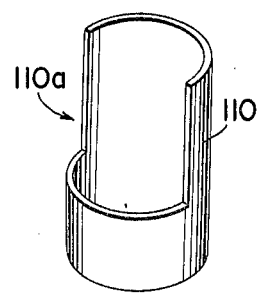

FIG. 38 shows a lug aperture 107 formed in one lateral edge of the tape cassette 71 adjacent to the rear surface thereof, and a semi-cylindrical lug 108 having a flat portion 108a is mounted in the lug aperture 107 by means of studs 108b. In the position shown in FIG. 38, the lug is in its closed position, but assumes an open position when the flat portion 108a thereof is exposed in the lug aperture 107. As illustrated in FIG. 39, this lug may be knurled around its one end, as shown at 108c. Alternatively, lugs as shown in FIGS. 40 and 41 may be used. FIG. 40 shows a hollow cylindrical lug 109 which is formed with a window 109a. FIG. 41 shows a cylindrical lug 110 having a notch 110a which extends around one-holf the periphery thereof. When the window 109a or the notch 110a is exposed, the lug aperture 107 is in its open position.

FIG. 42 shows a lug aperture 111 in the form of a notch which is centrally located in the rear portion of the tape cassette 71 so as to extend through both the upper and lower casing halves 71a, 71b. The lug aperture 111 is trapezoidal in configuration, fanning out into the interior of the cassette, and a complementarily shaped lug 112 is mounted therein. It is desirable to form the lug 112 from a resilient material such as a rubber or resilient plastic material. Alternatively, a lug 112a which is formed by bending a resilient sheet material into a channel configuration so that its limbs tend to move away from each other may be used. The lugs 112, 112a occupy either one-half of the space within the lug aperture 111, leaving the other one-half open so as to be moved between such vertically displaced positions.

FIG. 44 shows a cylindrical lug aperture 113 engaged by a lug 114 which is formed by a solid cylinder of a resilient material. The arrangement shown achieves the same result as shown in FIG. 42. The solid cylinder lug 114 may be replaced by a tubular lug 115 which is formed with a slit 115a extending axially therethrough so as to impart resilience thereto.

FIG. 40 shows a rectangular lug aperture 116 which extends through both the upper and lower casing halves 71a, 71b and which are formed with a pair of vertically spaced apart steps 116a, 116b. A lug 117 is formed into a complementary configuration to one-half the lug aperture 116. It is desirable to form the lug 117 of a resilient material, as described previously in connection with the lugs 112, 114.

FIG. 47 shows a lug 118 which is formed by bending a resilient sheet material into a channel shape so as to cause its limbs to move away from each other and which is formed with a pair of vertically spaced notches 118a, 118b in its base. The lug is adapted to be fitted into a rectangular lug aperture 119 formed in the tape cassette so as to occupy either upper or lower one-half thereof. A tool such as rod may be inserted into either notch 118a, 118b to shift the lug 118 to the other position. The lug 118 may be replaced by a lug 120 shown in FIG. 48 which comprises a resilient sheet material shaped into a box configuration having open top and bottom, with a pair of notches 120a, 120b being formed along the upper and lower edges of rear wall.

Figure 49:
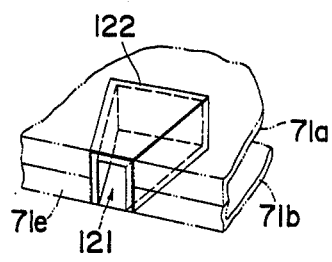
Figure 50:
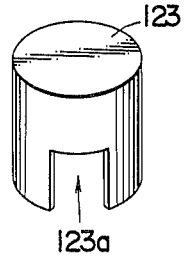
Figure 51:
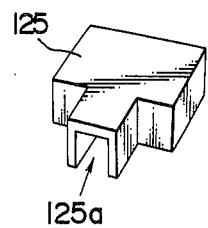
Figure 52:
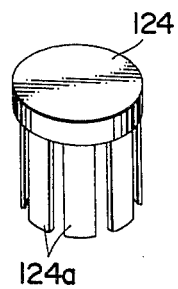
Figure 53:
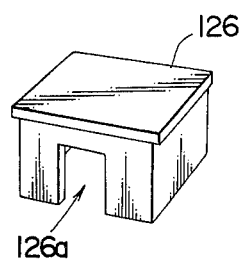
Figure 54:
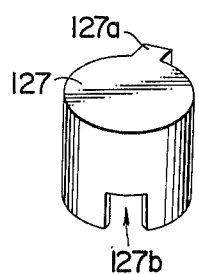

FIG. 49 shows a trapezoidal lug aperture 121 extending through the upper and lower casing halves 71a, 71b, and a lug 122 having a corresponding trapezoidal configuration is fitted into the aperture 121 from either A or B surface side. The lug 122 has a pair of limbs which are urged to move away from each other by the resilience of the material from which it is formed. The presence of the lug is detected from either side. The configuration of the lug aperture 121 and the lug 122 as viewed from either A or B surface may be varied to any one of the configurations illustrated in FIGS. 50 to 54 which show various forms of the lug. Specifically, FIGS. 50 and 52 show cylindrical or circular lugs 123, 124; FIG. 51 shows a lug 125 which comprises a combination of a smaller and a larger rectangles; FIG. 53 shows a rectangular lug 126; and FIG. 54 shows a cylindrical lug 127 which is provided with a projection 127a for preventing a rotation thereof. It will be appreciated that the lug aperture is shaped into a corresponding configuration. The lug may have a limb or leg of a suitble configuration. Specifically, a lug 123 shown in FIG. 50 is formed with a notch 123a, while lugs 126 and 127 shown in FIGS. 53 and 54, respectively, are formed with notches 126 and 127b, respectively, these notches serving to impart resilience to the limb or leg. A lug 125 shown in FIG. 51 is formed with an opening 125a in its limb, thereby improving the fitting engagement with the lug aperture. A lug 124 shown in FIG. 52 is provided with a plurality of resilient legs 124a, increasing the retention when it is mounted in place.

Figure 55:
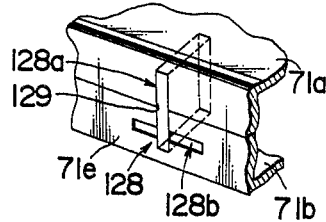
FIG. 55 is a fragmentary perspective view of the tape cassette according to the invention, illustrating a still another configuration of the lug.

FIG. 55 shows a lug aperture 128 which comprises a longitudinal slit 128a extending through both the upper and lower casing halves 71a, 71b, and a transverse slit 128b formed in the lower casing half 71b so as to intersect with the slit 128a. A plate-shaped lug 129 is fitted into either slit 128a or 128b. When the lug 129 is fitted into the longitudinal slit 128a, this represents a closed condition of the lug aperture 128 while an open condition is represented by the lug which is fitted into the transverse slit 128b.

In each of the embodiments mentioned above, the lug is separate from the tape cassette and is either displaced or removed therefrom to open or close the lug aperture as by using a readily available tool such as a pencil, thus without resort to a special tool. The lug and the lug aperture may be located at any desired position on the tape cassette, and the information which is obtained by detecting the presence or absence or the disposition of the lug can be utilized for the purpose of preventing a inadvertent erasure as well as distinguishing between a stereophonic and an educational tape, switching of a tape speed, a selection of Dolby circuit and switching of a bias voltage, or any combination thereof.

Figure 56:
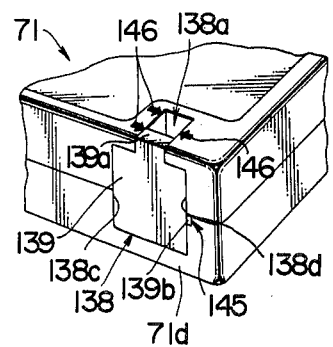
FIG. 56 is a fragmentary perspective view, showing a lug assembly.
Figure 62:
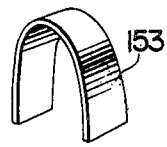
FIG. 62 is a perspective view of a folded leaf spring which is used in the tape cassette according to the invention.

Referring to FIGS. 56 and 62, a further embodiment of the lug assembly which is used in the tape cassette according to the invention will now be described. FIG. 56 shows a rectangular lug aperture 138 which is formed in the rear side 71d of the tape cassette 71 toward its one lateral side, the lug aperture 138 communicating with the A surface through a slot 138a. A lug 139 associated with the B surface is fitted into the aperture 138 from the rear of the tape cassette 71. As shown in FIG. 56, the lug 139 is complementary in configuration to the shape of the lug aperture 138 and is smaller than the latter. The lug 139 has a projection 139a which just fits in the slot 138a. Secured to the opposite side of the lug 139, that is, its surface facing the interior of the lug aperture 138, are a leaf spring 140 (see FIG. 57) which bears against an abutting wall 138b (see FIG. 58) of the aperture 138 to urge the lug 139 out of the aperture 138, as well as a spring 141 (see FIG. 57) which bears against the left-hand sidewall 138c, as viewed in FIG. 56, of the lug aperture 138 to bias the lug 139 toward the right-hand sidewall 138d (see FIG. 58).

Figure 57:
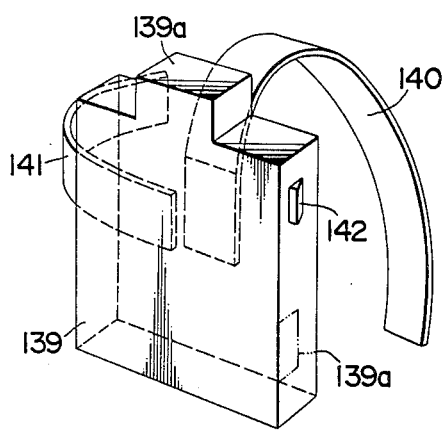
FIG. 57 is a perspective view of another example of the lug assembly.

The right-hand sidewall of the lug 139, as viewed in FIG. 57, is provided with a detent pawl 142 which is adapted to engage a channel 143 (see FIG. 58), formed in the right-hand sidewall 138d of the lug aperture 138, under the resilience of the leaf spring 141. Intermediate its length, the channel 143 is provided with a plurality of detent openings 144a, 144b and 144c which progressively controls the depth to which the lug 139 is fitted into the aperture. In the position shown in FIG. 56, the detent pawl 142 engages the outermost opening 144a to maintain the lug 139 in this outermost position.

Adjacent to its inlet opening, the right-hand sidewall 138d is formed with a notch 145 (see FIG. 58) which may be engaged by a tool such as rod to push a portion 139b (see FIG. 57) of the right-hand sidewall of the lug 139 against the leaf spring 141, thereby displacing it to the left, as viewed in FIG. 56, in order to disengage the detent pawl 142 from the opening 144a. If the lug 139 is then pressed inward into the lug aperture 138, the detent pawl 142 can be engaged with other detent openings 144b or 144c. In this manner, the depth to which the lug 139 is fitted into the lug aperture 138 can be varied in a stepwise manner. Such depth of the lug 139 may be detected by a suitable detector provided on the part of the associated tape recorder for operating another mechanism. Such mechanism may be utilized to prevent an inadvertent erasure of a monoaural tape or a stereophonic or educational tape, to switch the tape feed rate, to select a Dolby circuit or to change the bias voltage in accordance with the variety of the tape used. These functions may be combined in any desired manner. As shown in FIG. 56, the depth to which the lug 139 is fitted can be visually observed by providing an indicia such as shown at 146.

Figure 58:
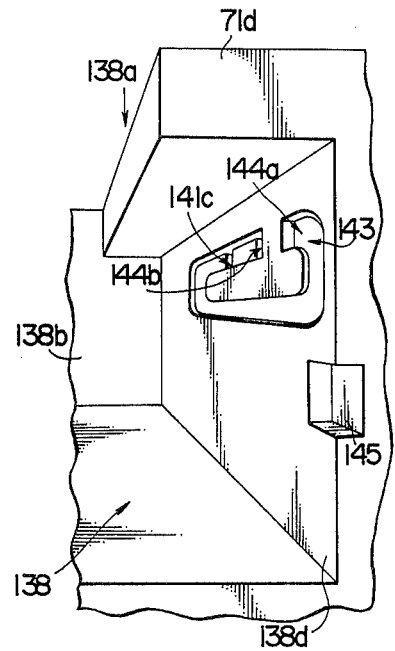
FIG. 58 is a fragmentary perspective view, showing an example of lug aperture.

As shown in FIG. 58, the channel 143 is formed as a closed loop, permitting the provision of a plurality of detent openings and also serving to prevent an unintended withdrawal of the lug 139 from the lug aperture 138. However, it should be understood that the channel may be in any desired configuration, and an unintended withdrawal of the lug 139 can be prevented by other means. A similar lug assembly associated with the A surface may be provided in the rear of the tape cassette 71 towards its opposite lateral side 71c. Alternatively, a plurality of such lug assemblies may be associated with a single surface of the tape cassette and/or located on other edge or surface thereof, or may be used in combination with lug assemblies of other forms.

Figure 59:
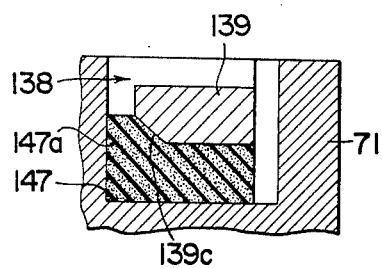
FIG. 59 is a cross section illustrating a further example of resilient means associated with the lug which is used in the tape cassette according to the invention.

FIG. 59 shows resilient means which may be used in place of the leaf springs 140, 141 to bias the lug 139 into engagement with the lug aperture 138. This resilient means comprises a resilient member 147 which is formed of a resilient rubber or plastic material. Specifically, the resilient member 147 includes a raised portion 147a which bears against a canted region 139c which is formed in the rear portion of the lug 139 to bias it so that the detent pawl 142 is engaged with the channel 143, the detent opening 144a or the like. As a whole, the resilient member 147 functions to urge the lug 139 out of the lug aperture 138.

Figure 60:
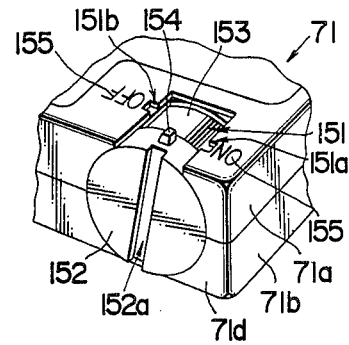
FIG. 60 is a perspective view of a different lug assembly.
Figure 61:
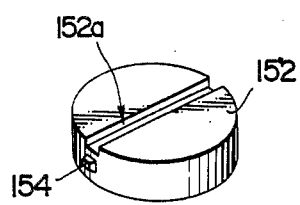
FIG. 61 is a perspective view, illustrating another form of the lug.

FIG. 60 shows a lug assembly including a cylindrical lug aperture 151 which is formed in the rear portion 71d of the tape cassette 71 so as to extend through both the A and B surfaces thereof. The lug aperture 151 is engaged by a disc-shaped lug 152 (see FIG. 61) which is resiliently biased by a folded leaf spring 153 (see FIG. 62) disposed therebetween. A tab 154 is formed on the periphery of the lug 152, which is also formed with a keyway 152a in one of its major surfaces, or in its upper surface, as viewed in FIG. 61. A pair of openings 151a, 151b are formed in the opposite lateral edges of the lug aperture 151 on its A surface side, and are selectively engaged by the tab 154 when the lug 152 is turned by inserting a coin, for example, with the keyway 152a, and turning it while forcing it into the lug aperture. The tab 154 functions in a manner similar to the detent pawl 142 mentioned above in connection with FIG. 57, and cooperates with the openings 151a, 151b to control the depth to which the lug 152 is fitted into the lug aperture. As illustrated in FIG. 60, indicia 155 such as ON or OFF may be applied to the A surface adjacent to these detent openings. It will be appreciated that the folded leaf spring 153 may be replaced by other resilient means such as coiled spring. A plurality of such lug assemblies may be provided or used in combination with other forms.

Figure 63:
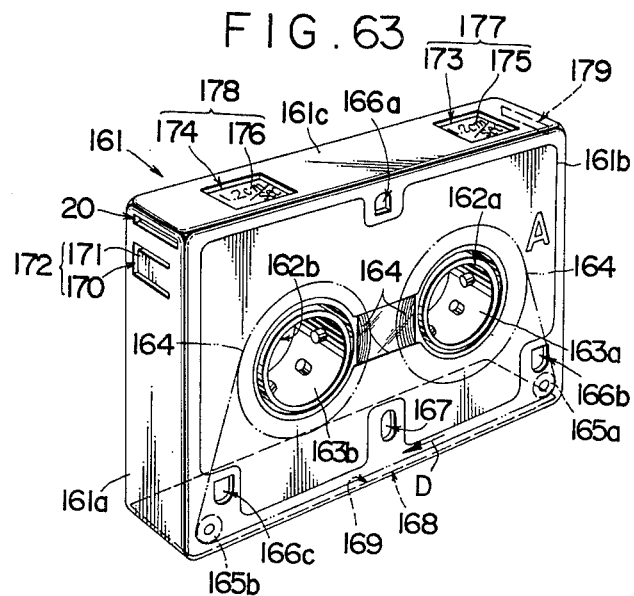
FIG. 63 is a perspective view of the tape cassette of the invention, illustrating a display plate which is used for preventing the occurrence of a wrong operation.

As assembly for preventing the occurrence of a wrong operation which may be incorporated into the tape cassette according to the invention will be described next. FIG. 63 shows a tape cassette 161 including a pair of hub apertures 162a, 162b which extends through the both casing halves for receiving a pair of tape hubs 163a, 163b. A tape 164, indicated in phantom line, is wound on and extends between the both tape hubs, and a pair of guide rollers 165a, 165b are disposed along the path of the tape. The tape cassette 161 is also formed with a positioning aperture 166a located centrally along the upper side and a pair of similar positioning apertures 160b, 166c which are located at the opposite ends of the lower portion. In addition, a capstan aperture 167 is formed centrally in the lower portion of the cassette. When the cassette 161 is loaded on a tape recorder, not shown, positioning tabs, not shown, which are provided on the part of the tape recorder engage the respective positioning apertures 166a to 166c to maintain the cassette 161 in a proper orientation, and a capstan, not shown, advances into the capstan aperture 167. When a record or playback operation is to be performed, the capstan is driven for rotation, and a pinch roller, not shown, extends into a tape exposure port which is formed in the lower lateral edge of the cassette 61 for abutting engagement with the capstan, thus feeding the tape 164 in the direction indicated by an arrow D along a path 169 which extends between the pair of guide rollers 165a, 165d.

The tape cassette 161 is provided with a lug assembly 172 of a conventional design which comprises a lug 171 and an associated lug aperture 170 which are located in the left-hand sidewall 161a thereof, as viewed in FIG. 63. The lug assembly 172 is utilized as means for preventing an inadvertent erasure of the B surface. A similar lug assembly, not shown, is located on the opposite sidewall 161b of the cassette 161 and is utilized to prevent an inadvertent erasure of the A surface. In each lug assembly, the presence of the lug indicates that a recording can be made on the associated surface while its absence indicates the incapability of making a record. When the tape recorder is in its record mode, a record head, not shown, advances into the tape path 169 through a port 168 for the purpose of recording, if the lug is present. However, the absence of the lug automatically prevents the record mode from being established.

Formed in the rear surface 161c, or the top surface as viewed in FIG. 63, of the tape cassettes 161 toward its opposite sides are a pair of windows 173, 174, in which a pair of display plates 175, 176 are mounted, forming a pair of assemblies 177, 178 which are operative to prevent the occurrence of a wrong operation. Each of the display plates 175, 176 comprises a thin sheet of a metal, plastics or wood (see FIG. 64), and is inserted into the display windows 174 or 175 through an insertion opening 179 or 180 which is formed in either sidewall 161a, 161b of the cassette at its topmost level (see FIG. 65).

Figure 64:
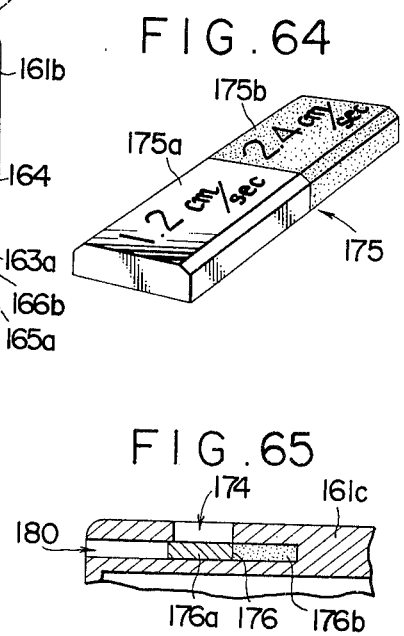
FIG. 64 is a perspective view of the display plate.
Figure 65:
FIG. 65 is a fragmentary cross section of the display plate which is set in place in the tape cassette of the invention.
Figure 68:
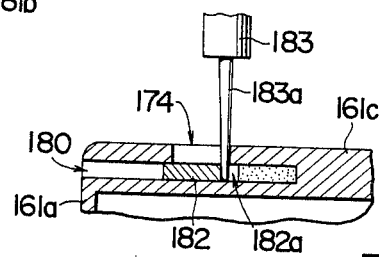
FIG. 68 is a fragmentary cross section, illustrating the manner of driving the display plate.

Referring to FIG. 64, the display plate 175 is in two parts 175a and 175b. The left-hand part 175a has a surface which is either electrically insulating or non-magnetic while the right-hand part 175b has a surface which is electricallly conductive or magnetized. Such distinction can be made in the display plate 175 by adhesively bonding an insulating material to a conductive material which together form the respective parts in a side-by-side relationship, by using an insulating substrate, one-half of which surface is either electroplated or laminated with a conductive material, or by using a conductive material, one-half of which surface is laminated with an insulating material. Where the distinction is that of a non-magnetic surface and a magnetized surface, the respective parts can be made from a non-magnetic material and a magnetized material which are bonded together, or the part of a non-magnetic material may be adhesively bonded with a magnetizable material which is subsequently magnetized. The display plate 176 is similarly formed.

In the present embodiment, the assemblies 177, 178 are used for indicating the tape feed rate. Each of the display plates 175, 176 is provided with legends of 1.2 cm/sec and 2.4 cm/sec in its left- and right-hand parts, respectively (see FIG. 64). The tape rate of 1.2 cm/sec is used when recording a usual conversation, and the tape rate of 2.4 cm/sec is used when recording a music, for example.

When the display plates 175, 176 are inserted deeper into the openings 179, 180, the legends indicating the rate of 1.2 cm/sec are visible through the windows 173, 174, respectively, and when the display plates 175, 176 are moved back toward the openings 179, 180 by engaging a pointed rod or the like therewith through the windows 175, 176, the legends indicating the rate of 2.4 cm/sec are visible. In this manner, a visual recognition of the tape rate is permitted. On the other hand, the tape recoder is provided with an electrical or magnetic detector which detects whether the part of the display plates 175, 176 which is exposed through the windows 173, 174 is insulating or conductive, or whether it be non-magnetic or magnetized. When the detector indicates that the exposed surface is either insulating or non-magnetic, the detector is operative to change the tape feed rate to 1.2 cm/sec automatically. Alternatively, when a conductive or magnetized surface is exposed, the tape feed rate is automatically changed to 2.4 cm/sec. An electrical detector may comprise a switch having contact pieces which are either turned on or off through a conductive or non-conductive part of the display plate. Alternatively, the display plate itself may be constructed as a sliding switch. A magnetic detector may comprise a reed switch or a magnetic head.

Figure 66:
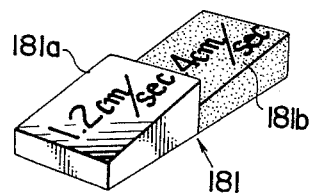
FIGS. 66 and 67 are perspective views, illustrating further examples of the display plate.
Figure 67:
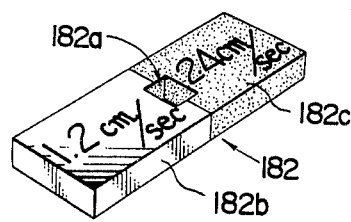

FIG. 66 shows a display plate 171 having a sawtooth-shaped surface in order to facilitate a sliding displacement thereof in the display windows 173, 174. FIG. 67 shows a different display plate 182 which is provided with a slot 182a intermediate the two parts for facilitating its drive. The provision of the sawtooth-shaped surface or the slot permits these display plates 181, 182 to be easily displaced by means of the tip 183a of an auger 183. It is to be noted tht the right-hand part 181a, 182b of the respective display plates 181, 182 has an insulating or non-magnetic surface while the right-hand part 181b, 182c has a conductive or magnetized surface. It is a matter of design to choose either part of the display plates 175, 176, 181, 182 as a conductive or insulating surface or as a non-magnetized or magnetized surface. The insertion openings 179, 180 may be closed subsequent to the insertion of the display plates. Where the display plates are assembled into the cassette during its assembly, the insertion openings need not be provided.

Figure 69:
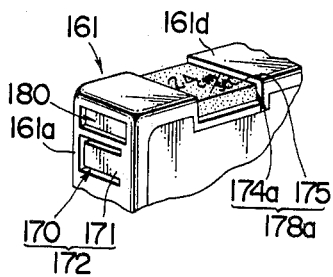
FIG. 69 is a perspective view of the display plate in accordance with another embodiment of the invention.

FIG. 69 shows an assembly 178 which prevents the occurrence of a wrong operation of the tape cassette in which a display window 174a of the assembly is constructed to expose a display plate on either A or B surface. This does not restrict the electrical or magnetic detection to only the rear surface 161d of the tape cassette 161, but the detection may be made on either A or B surface through the window 174a, thus affording a freedom of design of the apparatus.

It has been mentioned above that the tape feed rate is chosen to be 1.2 cm/sec for a usual recording and 2.4 cm/sec when recording a music. If a reverse choice is made by an attempt to perform a wrong operation, the chosen tape feed rate will be improper, disabling a desired recording or playback operation. However, with the assembly according to the invention, the tape feed rate can be visually observed on the tape cassette, and the tape recorder can be automatically controlled in either electrical or magnetical manner.

A further embodiment of the assembly for preventing the occurrence of a wrong operation which is provided in the tape cassette according to the invention will be described with reference to FIG. 70. In this Figure, a tape cassette 191 is formed with a recess 192a in its rear wall 191a into which a lug member 193 is fitted. The cassette 191 is formed with a pair of apertures 194, 195, in which a pair of tape hubs 196, 197 are rotatably disposed for engagement with tape drive shafts, not shown, which are provided on the part of a tape recorder. A magnetic tape, not shown, has its opposite ends secured to the both hubs, and extends therebetween in taut condition along a path which extends along the front end face of the cassette which is located opposite to the rear wall 191a. Positioning apertures 198, 199, 200 and a capstan aperture 201 are shown formed in the cassette, extending through the both casing halves thereof.

The lug member 193 is fixedly mounted on an axle 202 (see FIGS. 71, 72) which is disposed horizontally in parallel relationship with the tape run located along the tape exposure ports and which is rotatably disposed in semicircular grooves formed in upper and lower casing halves 191b, 191c of the cassette 191, whereby it is rotatably mounted in the recess 192. On its one surface 193a, the lug member 193 is formed with a recess 193b. The lug member 193 is movable between a first position in which the recess 193b is exposed through the rear wall 191a of the tape cassette 191 and a second position which is rotated by 180° about the pivot 202 from the first mentioned position and in which another surface 193c (see FIG. 72) which is diametrically opposite to the one surface 193a is exposed through the rear wall 191a. The lug member 193 is retained in either position by a click stop mechanism comprising a clicking depression 243 (see FIG. 71) formed in the lateral side of the lug member 193, and a protuberance 204 which projects from the wall of the recess 192 for fitting engagement with the clicking depression 243. When the lug member 193 is retained in either position by this mechanism, the surface 193a or 193c is flush with the rear surface 191a. When the cassette 191 is loaded on an associated tape recorder, the presence or absence of the recess 193b in the surface 193a of the lug member 193 is detected by a suitable detector, not shown, provided on the part of the recorder.

In the present embodiment, the lug member 193 is utilized for switching the tape rate. In one example, the tape recorder on which the cassette 191 is loaded has two tape feed rates of 1.2 cm/sec and 2.4 cm/sec, which can be automatically chosen by the above mentioned lug detector which responds to the orientation of the lug member 193, when the cassettee 191 is loaded. In this manner, two tape feed rates can be selectively chosen by a mere rotation of the lug member 193 through 180° about the pivot 202. Such tape feed rate can be visually displayed by providing the legend 2.4 cm/sec on the surface 193d which assumes a top level when the surface 193d is exposed through the rear wall 191a, and providing the legend of 1.2 cm/sec on its surface 193e which assumes a top level when the other surface 193c is exposed through the rear wall 191a.

While in the embodiment described above, the recess 193b is formed in one of the surfaces which are detected to recognize the orientation of the lug member, it may be replaced by a recessed groove 203b as shown in FIG. 73. In this instance, the recessed groove 203b is formed in both the front and rear surfaces 203a, 203c of a lug member 203. The surfaces 203a, 203c represent one position of the lug member when exposed, and surfaces 203d, 203e which are interposed between the first mentioned surfaces 203a, 203c represent the other position of the lug member. Thus, the two positions of the lug member is angularly spaced by 90°.

In the embodiment mentioned above, the lug members 193, 203 are formed with recess 193b are recessed grooves 203b to make a distinction over the other surfaces 193d, 193e and 203d, 203e. However, as illustrated in FIG. 75, a lug member 213 having a rectangular cross section may be used to change the distance from the axis of the pivot 202 to either surface to be detected, thus replacing the recess or grooves mentioned above. In this instance, a legend indicating one of the tape feed rates, for example, 2.4 cm/sec, may be applied to one of surfaces 213d, 213e which is then the top surface of the lug member when either surface 213a or 213c is exposed through the lug aperture, and the other legend of 1.2 cm/sec may be applied to either surface 213a, 213c which becomes the top surface of the lug member when the other surface 213d or 213e is exposed, thus providing a visual indication of the tape feed rate. In this instance, the switching of the tape feed rate takes place by a rotation of the lug member through 90°.

FIGS. 74, 76 and 77 show an additional embodiment in which a lug member 223 is rectangular in both longitudinal and transverse section, and the pivot 202 is mounted to the lug member at an eccentric position so that three surfaces thereof may be utilized for the purpose of detection when the lug member is rotated through an increment of 90°. Specifically, the lug member includes a first surface 223a, a second and a third surface 223d, 223e which is immediately contiguous with the first surface 223a and lying in a plane at right angles to the first mentioned surface 223a, and a rear surface or fourth surface 223c, all of which are located at mutually different distances from the pivot 202, so that a lug detection member which is adapted to bear against the lug member can be displaced by a mutually different amount when it bears against the respective surfaces of the lug member, thus enabling a three position control. A corresponding indication or legend may be applied to each adjacent surface which becomes the top surface when the particular surface is exposed.

Figure 78:
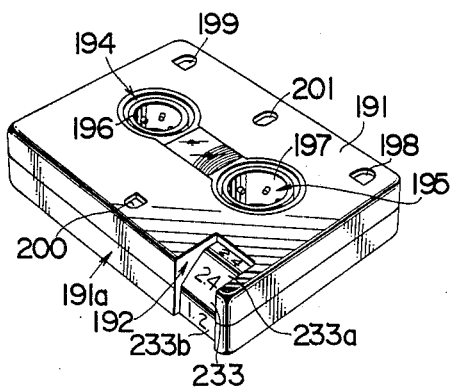
FIG. 78 is a perspective view of the tape cassette according to an additional embodiment of the invention.
Figure 79:
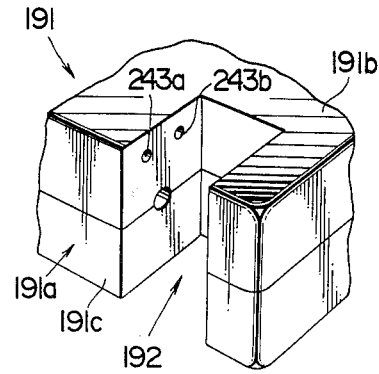
FIG. 79 is a perspective view, illustrating the recess which receives the lug member used in the tape cassette shown in FIG. 78.
Figure 80:
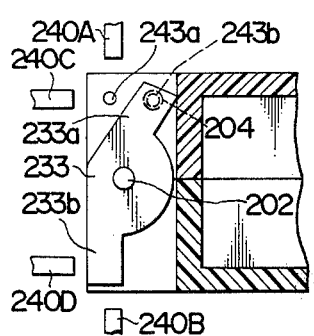
FIG. 80 is a side elevation of the lug member shown in FIG. 78.

FIGS. 78, 79 and 80 show still another embodiment employing a lug member 233 in the form of a lever pivotally mounted at 202. The rocking movement thereof is constrained by a click stop mechanism comprising a pair of clicking grooves 243a, 243b formed in the recess 192 and a clicking tab 204 laterally extending from an upper arm 233a of the lug member 233. Lug detection members 240A, 240B, 240C, 240D may be located above or below the lug member, or at a position opposite the upper arm 233a or at a position opposite to a lower arm 233b of the lug member. Legends indicating the significance of the switching control may be applied to the respective exposed surface for the convenience of visually confirming the intended operation of the cassette 191. The intended switching function is achieved by a mere angular movement of the lug member, which can be moved out of and resumed to the original position repeatedly.

Figure 81:
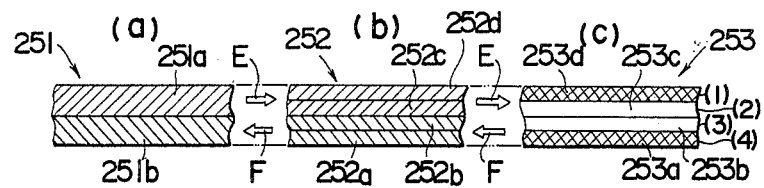
FIG. 81 is a front view, partially cut away, of the magnetic tape, illustrating the configuration of the tracks formed thereon by a variety of tape recorders.

Still another embodiment of the lug assembly which may be used in the tape cassette according to the invention will be described with reference to FIGS. 81 to 85. In the embodiment to be described, a pair of lugs are located in a single lug aperture. Tape recorders employing tape cassettes can be broadly categorized into a general purpose recorder including both monoaural and stereophonic applications, and an educational use recorder which may be used for educational purposes such as in language laboratories. The magnetic tape of the tape cassette which is to be loaded on such recorders is formed with a track or tracks corresponding to the magnetic head or heads provided on the part of the tape recorder. Sections (a), (b) and (c) of FIG. 81 show several examples of recording tracks. Specifically, FIG. 81, section (a) shows a tape 251 having a track which is formed for use with a monoaural tape recorder. FIG. 81, section (b) shows a tape 252 having tracks which are formed for use with a stereophonic tape recorder, and FIG. 81, section (c) shows a tape 253 having tracks which are formed for use with an educational use tape recorder.

As is well known, a magnetic head of a monoaural tape recorder is adapted to form a pair of single channel tracks on the magnetic tape 251, as shown in FIG. 81, section (a). Thus, when the tape 251 runs in the direction indicated by an arrow E, a single channel track 251a is formed in the upper half of the tape while another single channel track 251b is formed in the lower half thereof when the tape runs in the direction indicated by an arrow F. The magnetic head assembly of a stereophonic tape recorder forms four tracks. As indicated in FIG. 81, section (b), when the tape runs in the direction of the arrow E, a third and a fourth track 252c, 252d are formed by a right channel head and a left channel head, respectively, while a first and second track 252a, 252b are formed when the tape 252 runs in the direction of the arrow F. The educational tape 253 shown in FIG. 81, section (c) is formed with two channel, four tracks. The tape 253 is different from usual tapes 251, 252, and a commercially available tape 253 is already recorded with the educational information in its first and fourth track 253a, 253d. An educational use tape recorder on which the tape 253 is to be loaded is constructed such that no further recording is possible on the first and the fourth track 253a, 253d while permitting a recording only on a second and a third track 253b, 253c. This is so constructed because the arrangement is such that during the time the tape 253 runs in the direction of the arrow E, a student listens to the reproduction from the fourth track 253d and records his own pronunciation onto the third track 253c, and listens to the reproduction from the first track 253a and record his own pronunciation on the second track 253b during the running of the tape 253 in the opposite direction indicated by the arrow F. Thus, only the second and the third track 253b, 253c may be used for both recording and reproduction while the first and the fourth track 253a, 253b is only subject to reproduction.

It will be appreciated from the above that the tracks formed on the magnetic tape vary with the type of tape recorders with which they are to be used. In either form, if a lug is removed from a particular tape cassette, a recording on the tape is no longer possible, and that tape can only be used for reproduction. Commercially available tape cassettes are of a common configuration regardless of their monoaural, stereophonic or educationally use, and thus can be loaded on a tape recorder of any tape. If an educational tape cassette is inadvertently loaded on a stereophonic tape recorder, the stored information may be erased. Specifically, in an educational tape cassette, lugs associated with the second and the third track 253b, 253c are not removed so as to permit a free recording and play back on or from these tracks. If this cassette is loaded on a stereophonic tape recorder, the right channel head and the left channel head of the recorder will operate on the first and second track 253a, 253b or on the third and the fourth track 253c, 253d, respectively, so that if a stereophonic recording is attempted, the information already recorded on the first or the fourth track 253a or 253d which must not be erased will be erased, and then recorded with one channel signal of the stereophonic recording. Such a disadvantage results from the fact found in a conventional tape cassette that the presence or absence of a single lug is detected to control the capability or incapability of recording.

Figure 82:
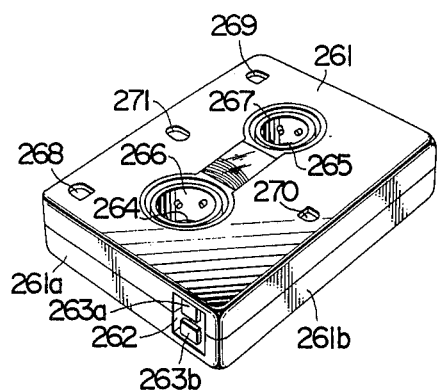
FIG. 82 is a perspective view of the tape cassette according to still another embodiment of the invention.

In accordance with the present embodiment of the invention, the above disadvantage is eliminated by providing more than one lug in the tape cassette, and the combination of the presence or absence of such lugs is detected by a lug detection member. In this manner, the lug detection member detects a number of operational conditions. Referring to FIG. 82, there is shown a perspective view of the tape cassette according to the invention. The tape cassette 261 shown is formed as a miniature tape cassette having a dimension comparable to a packet of matches. The cassette 261 is similar in construction to a known miniature tape cassette except that a pair of lugs 263a, 263b are disposed in a recess 262 formed in a lateral edge wall 261a of the cassette. Specifically, in its major surfaces, the cassette 261 is formed with a pair of spaced apart apertures 264, 265 in which a pair of tape hubs 266, 267 are rotatably disposed for engagement by tape drive shafts, not shown, which are provided on the part of the tape recorder. A magnetic tape, not shown, has its opposite ends secured to the respective hubs and then wound thereon so as to pass along the front end face of the cassette which is located opposite to the wall 261b shown. The cassette is also formed with positioning apertures 268, 269, 270 and a capstan aperture 271 which are formed so as to extend through both upper and lower casing halves of the cassette 261.

The lugs 263a, 263b are disposed in vertical alignment with each other in the recess 262, and can be broken as desired from the exterior of the cassette. The lugs 263a, 263b thus formed are adapted to have its presence or absence detected by a lug detection member 272 or 273 in the manner as illustrated in the chart of FIG. 83. The lug detection member 272 is provided on a usual tape recorder which is ordinarily provided on a monoaural or stereophonic tape recorder, and detects the presence or absence of only one of the lugs, 263b, through its displacement. This detection member enables a recording by the tape recorder when the lug 263b is present, but disables a recording when the lug 263b or the both lugs 263a, 263b are broken and absent.

The other lug detection member 273 is provided on an educational use tape recorder, and is formed adjacent to its top end with a first detection piece 273b which is adapted to detect the presence or absence of one lug 263a, and also with a second detection piece 273a which is located below the first detection piece and projects toward the other lug 263b for detection thereof. The lug detection members 272 and 273 operate in the manner as illustrated in the chart of FIG. 83. Specifically, when the both lugs 263a, 263b are present, the both lug detection members 272, 273 detect the presence of the lug 263b in a usual tape recorder as wel as in an educational use tape recorder, as shown in FIG. 83, boxes (A) and (B), so that they are not displaced and enable a recording by the associated tape recorder. It is to be understood, however, that no commercially available educational cassette is in this form since then the presence of the lug 263b enables a recording on all of the tracks 253a to 253d (see FIG. 81, section (c)), permitting the teaching information contained on the first and the fourth tracks 253a, 253d to be lost. Thus, a commercially available educational cassette has its lower lug 263b broken, leaving only the upper lug 263a in place, as shown in FIG. 83, box (D). The removal of the lower lug 263b implies the possibility of a recording on only selected tracks (the second and the third tracks 253b, 253c shown in FIG. 81, section (c)). A recording on these tracks is enabled by a displacement of the lug detection member 273 which occurs when the absence of the lug 263b is detected by the second detection piece 273a of the lug detection member 273. The presence of the upper lug 263a is detected by the first detection piece 273b, so that the displacement of the lug detection member 273 is limited by the abutment between the lug 263a and the first detection piece 273b, the limited displacement of the lug detection member 273 enabling a recording on only selected tracks as mentioned above.

When the both lugs 263a, 263b are removed, the lug detection members 272, 273 or the lug detection member of a tape recorder of any type detect and absence of the both lugs, whereby they are displaced by an increased distance into the recess 262, the increased amount of the displacement disabling a recording by the tape recorder, as shown in FIG. 83, boxes (E) and (F). Thus, when a lug detection member 273 is displaced through an increased extent, a recording by the educational use tape recorder is disabled.

With this arrangement, if an educational tape cassette is inadvertently loaded on a stereophonic tape recorder, the removal of the lower lug 263b is detected by the lug detection member 272 to cause a displacement of the member 272 as shown in FIG. 83, box (C), thereby disabling a recording by the tape recorder. In this manner, the loss of educational information previously recorded on the cassette tape is avoided.

In the embodiment shown in FIG. 82, the lugs are disposed in vertical alignment in the recess 262, but they may be disposed in horizontal alignment or side by side as shown in FIG. 84. Alternatively, they may be disposed on behind the other. When the lugs are disposed side by side as shown in FIG. 84, a lug detection member 273 as illustrated in FIG. 85 may be used.

While the above embodiment has been described as applied to prevent an inadvertent erasure, it should be understood that the lug or lug assembly mentioned can be utilized to switching a bias voltage, switching a tape feed rate or a control of Dolby circuit. The location of the lugs is not limited to the edge wall 261a, but may be transferred to the rear wall. It will be appreciated that the tape cassette according to the invention eliminates a number of disadvantages found in conventional tape cassettes, and increases the control capability of an associated tape recorder.

What is claimed is:

1. A tape cassette comprising a pair of casing halves which are abutted together, the pair of casing halves including a plurality of frame portions extending therefrom to define a plurality of tape exposure ports, the frame portions disposed in abutting relationship having a complementary configuration to each other and defining a gap therebetween which extends in a direction different from the running direction of a magnetic tape contained in the cassette along the tape exposure ports.

2. A tape cassette according to claim 1, further including a pair of hubs rotatably disposed in the cassette for carrying a length of magnetic tape thereon, and means for securing the opposite ends of the tape to the respective hubs, said means being associated with each of the tape hubs and each comprising a recess formed in the periphery of the hub, a tab formed on one sidewall of the recess, a nipple of a resilient material formed on another sidewall of the recess in opposing relationship with the tab, and a detent member formed with a pair of dimples in its opposite sidewalls and adapted to be fitted into the recess together with a tape end until the dimples are engaged by the nipple and the tab, respectively, the detent member having an outer surface which has a length greater than the length of the inner end face and which has a curvature substantially equal to the curvature of the periphery of the hub.

3. A tape cassette according to claim 1, further including a label applied to its major surface, the label covering selected apertures formed in the tape cassette when it is applied to the major surface thereof, the label having a removable portion which can be removed to expose a selected aperture.

4. A tape cassette according to claim 1 in which a cassette tape is operatively contained therein so as to permit a recording on a pair of tracks thereon when the tape cassette is loaded on an associated cassette tape recorder, further including a pair of lugs which can be removed to prevent an inadvertent erasure of a record on the respective tracks, said lugs being of a color different from that of the tape cassette.

5. A tape cassette according to claim 1, further including a lug assembly which comprises a lug aperture formed in the tape cassette, a lug displaceably disposed in the lug aperture, and means for selectively retaining the lug in a first position in which the lug blocks the lug aperture and a second position in which it clears the lug aperture.

6. A tape cassette according to claim 5 in which the lug is slidably mounted in the lug aperture.

7. A tape cassette according to claim 5 in which the lug is rockably mounted in the lug aperture.

8. A tape cassette according to claim 5 in which the lug is rotatably mounted in the lug aperture.

9. A tape cassette according to claim 1, further including a lug assembly which comprises a lug aperture formed in the tape cassette, a lug fitted into the lug aperture, a detent pawl formed on the lug, a plurality of detent openings formed in the lug aperture and adapted to be selectively engaged by the detent pawl as the lug is fitted into the lug aperture for stepwise controlling the depth to which the lug is fitted into the lug aperture, and resilient means for urging the detent pawl to engage one of the detent openings.

10. A tape cassette according to claim 1, further including means for preventing the occurrence of a wrong operation, said means comprising a display window formed in the tape cassette, a display member slidably mounted beneath the display window so as to traverse thereacross, the display member including a plurality of areas carrying different displays, and electromagnetic means for recognizing a particular display on the display member which is exposed through the display window.

11. A tape cassette according to claim 1, further including a recess formed in the tape cassette, a lug member rotatably mounted in the recess on an axle which extends in a direction parallel to the running direction of a magnetic tape contained in the tape cassette, the lug member having a plurality of surfaces to be detected by a lug detection member provided on the part of an associated tape recorder, a selected one of the surfaces being exposed through the recess as the lug member rotates, and a display on the respective surfaces for indicating a particular surface which is exposed through the recess.

12. A tape cassette according to claim 1, further including a recess formed in the tape cassette, and a plurality of lugs disposed in the recess and having operative association with a lug detection member provided on the part of an associated tape recorder which detects a particular combination of the presence or absence of the lugs to control the operation of the tape recorder.

13. A tape cassette comprising a pair of casing halves which are abutted together, the pair of casing halves including a plurality of frame portions extending therefrom to define a plurality of tape exposure ports;

a pair of hubs rotatably disposed in the cassette for carrying a length of magnetic tape thereon, and means for securing the opposite ends of the tape to the respective hubs, said means being associated with each of the tape hubs and each comprising a recess formed in the periphery of the hub, a tab formed on one sidewall of the recess, a nipple of a resilient material formed on another sidewall of the recess in opposing relationship with the tab, and a detent member formed with a pair of dimples in its opposite sidewalls and adapted to be fitted into the recess together with a tape end until the dimples are engaged by the nipple and the tab, respectively, the detent member having an outer surface which has a length greater than the length of the inner end face and which has a curvature substantially equal to the curvature of the periphery of the hub.

14. A tape cassette comprising a pair of casing halves which are abutted together, the pair of casing halves including a plurality of frame portions extending therefrom to define a plurality of tape exposure ports, a lug assembly which comprises a lug aperture formed in the tape cassette, a lug fitted into the lug aperture, a detent pawl formed on the lug, a plurality of detent openings formed in the lug aperture and adapted to be selectively engaged by the detent pawl as the lug is fitted into the lug aperture for stepwise controlling the depth to which the lug is fitted into the lug aperture, and resilient means for urging the detent pawl to engage one of the detent openings.

15. A tape cassette comprising a pair of casing halves which are abutted together, the pair of casing halves including a plurality of frame portions extending therefrom to define a plurality of tape exposure ports, means for preventing the occurrence of a wrong operation, said means comprising a display window formed in the tape cassette, a display member slidably mounted beneath the display window so as to traverse thereacross, the display member including a plurality of areas carrying different displays, and electromagnetic means for recognizing a particular display on the display member which is exposed through the display window.

16. A tape cassette comprising a pair of casing halves which are abutted together, the pair of casing halves including a plurality of frame portions extending therefrom to define a plurality of tape exposure ports, a recess formed in the tape cassette, a lug member, rotatably mounted in the recess on an axle which extends in a direction parallel to the running direction of a magnetic tape contained in the tape cassette, the lug member having a plurality of surfaces to be detected by a lug detection member provided on the part of an associated tape recorder, a selected one of the surfaces being exposed through the recess as the lug member rotates, and a display on the respective surfaces for indicating a particular surface which is exposed through the recess.

17. A tape cassette comprising a pair of casing halves which are abutted together, the pair of casing halves including a plurality of frame portions extending therefrom to define a plurality of tape exposure ports, a recess formed in the tape cassette, and a plurality of lugs disposed in the recess and having operative association with a lug detection member provided on the part of an associated tape recorder which detects a particular combination of the presence or absence of the lugs to control the operation of the tape recorder.

* * * * *